US007013385B2

(12) United States Patent
Abbondanzio et al.

(10) Patent No.: US 7,013,385 B2
(45) Date of Patent: Mar. 14, 2006

(54) REMOTELY CONTROLLED BOOT SETTINGS IN A SERVER BLADE ENVIRONMENT

(75) Inventors: Antonio Abbondanzio, Raleigh, NC (US); Gregory William Dake, Durham, NC (US); William Joseph Piazza, Holly Springs, NC (US); Gregory Brian Pruett, Raleigh, NC (US); David B. Rhoades, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 618 days.

(21) Appl. No.: 10/064,012

(22) Filed: Jun. 4, 2002

(65) Prior Publication Data

US 2003/0226004 A1 Dec. 4, 2003

(51) Int. Cl.
G06F 9/445 (2006.01)
(52) U.S. Cl. .......................... 713/2; 713/100
(58) Field of Classification Search ............. 713/1, 713/300, 100, 2; 711/200
See application file for complete search history.

(56) References Cited

U.S. PATENT DOCUMENTS

| | | | |
|---|---|---|---|
| 5,230,052 A * | 7/1993 | Dayan et al. .................. 713/2 |
| 5,410,706 A | 4/1995 | Farrand et al. | |
| 5,452,454 A | 9/1995 | Basu | |
| 5,732,268 A | 3/1998 | Bizzarri | |
| 5,828,888 A * | 10/1998 | Kozaki et al. .............. 717/170 |
| 5,860,001 A | 1/1999 | Cromer et al. | |
| 5,974,547 A | 10/1999 | Klimenko | |
| 5,978,912 A | 11/1999 | Rakavy et al. | |
| 6,032,239 A | 2/2000 | Beelitz | |
| 6,101,617 A | 8/2000 | Burckhartt et al. | |
| 6,151,674 A | 11/2000 | Takatani | |
| 6,202,091 B1 | 3/2001 | Godse | |
| 6,275,851 B1 | 8/2001 | Cromer et al. | |
| 6,282,642 B1 * | 8/2001 | Cromer et al. .................. 713/2 |

(Continued)

FOREIGN PATENT DOCUMENTS

| JP | 11143691 A | 5/1999 |
|---|---|---|
| JP | 2000035947 A | 2/2000 |

OTHER PUBLICATIONS

Hubacher, K et al, "Remotely Controlled Boot Manager," IBM Dossier AUS9-1999-0260 for U.S. Appl. No. 09/389,440, filed Sep. 2, 1999.

(Continued)

Primary Examiner—Thomas Lee
Assistant Examiner—Vincent Tran
(74) Attorney, Agent, or Firm—Joseph P. Lally; Martin J. McKinley (57) ABSTRACT

A system for storing and configuring CMOS setting information remotely in a sewer blade environment includes a management module having includes persistent storage containing a table of CMOS setting information for each server blade. Each server blade includes boot block software that executes when the blade is booted. The boot block software initiates communication with the management module and retrieves its CMOS settings from the table. Thus, CMOS settings for a particular blade location remain unchanged each time a blade is replaced or upgraded. The management module and saver blades may implement a programming interface tat includes command abstractions for each CMOS setting. The management module sends command abstractions to each sewer blade during the CMOS configuration process. The server blade interprets the commands and maps the commands to specific CMOS bit addresses thereby making the specific CMOS implementation employed by any server blade transparent to the management module.

15 Claims, 5 Drawing Sheets

U.S. PATENT DOCUMENTS

| | | | |
|---|---|---|---|
| 6,356,965 B1 * | 3/2002 | Broyles et al. | 710/104 |
| 6,594,150 B1 * | 7/2003 | Creason et al. | 361/727 |
| 6,622,243 B1 * | 9/2003 | Christeson | 713/1 |
| 6,763,457 B1 * | 7/2004 | Aguilar et al. | 713/2 |
| 2002/0099934 A1 * | 7/2002 | Cromer et al. | |
| 2003/0097487 A1 * | 5/2003 | Rietze et al. | |

OTHER PUBLICATIONS

Blam, N.M. et al, "Method and System for Automatically Configuring the Boot Process of a Network Computer System," IBM Dossier AUS9-1999-0575 for U.S. Appl. No. 09/397,609, filed Sep. 16, 1999.

* cited by examiner

|  | 142a | 142b |  | 142n |
|---|---|---|---|---|
|  | 100a | 100b | . . . | 100n |
| 144a Setting1 |  |  |  |  |
| 144b Setting2 |  |  |  |  |
| ⋮ |  |  |  |  |
| 144m SettingM |  |  |  |  |

REMOTELY CONTROLLED BOOT SETTINGS IN A SERVER BLADE ENVIRONMENT

BACKGROUND OF INVENTION

1. Field of the Present Invention

The present invention generally relates to the field of data processing systems and more particularly to a method and system for remote storage of boot configuration information (CMOS settings) in a data processing environment comprising multiple replaceable server blades.

2. History of Related Art

In the field of microprocessor-based data processing systems, boot configuration information, also referred to as "CMOS" settings or "BIOS setup information," is typically stored in a battery-backed CMOS storage device of the system. When the system is booted, the boot code retrieves the CMOS settings and configures various parameters of the system based on the retrieved values. CMOS settings can define parameters including power management modes, cooling control modes, and various timeout settings that control when the system transitions from one state to another. In environments where the processor blade (the printed circuit board, such as a motherboard in a desktop machine, to which the main processor or processors are connected) is changed infrequently, local storage of CMOS settings on the blade is logical.

In other environments, however, storing CMOS settings locally may present compatibility, flexibility, and management issues. In a server blade environment, small form-factor server devices (server blades) can be hot-plugged into a single chassis or cabinet with each blade sharing power, network connections, fans, and management resources. When replacing or upgrading blades, it is desirable to have the newly installed blades function identically to the previous blade. Achieving this goal with server blades on which CMOS settings are stored locally requires mass configuration.

Mass configuration of CMOS settings is typically accomplished by cloning a boot configuration data block across a number of systems. Unfortunately, this method of configuration, typically referred to as cloning, is only possible after each system has been setup with its associated peripherals and power is applied. Moreover, cloning is only possible if the BIOS version and hardware of the systems are substantially identical. BIOS firmware versions and hardware implementations are notoriously unique. A CMOS setting located at a particular memory address in one system is often not located at the same memory address in a different system having a different BIOS version. For this reason cloning is not a highly effective or desirable solution to the problem of insuring compatibility and plug-replaceability among a large number of server blades that may or may not have identical BIOS versions.

SUMMARY OF INVENTION

The problem identified above is addressed by a method and system for storing and configuring CMOS setting information remotely in a server blade environment. The system includes a management module configured to act as a service processor to a data processing configuration comprising a set of one or more server blades sharing common resources such as system power and cooling fans. The management module includes persistent storage in which is stored a table containing CMOS setting information for each server blade in the configuration. Each server blade includes boot block software that executes when the blade is booted after power-on or system reset. The boot block software initiates communication with the management module and retrieves its CMOS settings from the management modules CMOS setting table. In this manner, CMOS settings for a particular blade location in the configuration remain unchanged each time a blade is replaced or upgraded. In one embodiment, the management module and server blades implement a programming interface that includes command abstractions corresponding to each CMOS setting. In this embodiment, the management module sends command abstractions to each server blade during the CMOS configuration process. The server blade is configured to interpret the commands and map the commands to specific CMOS bit addresses thereby making the specific CMOS implementation employed by any server blade transparent to the management module.

BRIEF DESCRIPTION OF DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION

Generally speaking the present invention contemplates a system and method for remote storage and configuration of CMOS settings for a data processing environment having a plurality of replaceable data processing system blades. CMOS setting information is stored off-blade and retrieved when a blade is inserted or otherwise booted. By storing CMOS setting information remotely, the present invention enables blades that are completely stateless thereby simplifying the process of replacing old or malfunctioning blades with new blades.

Figure 1A:
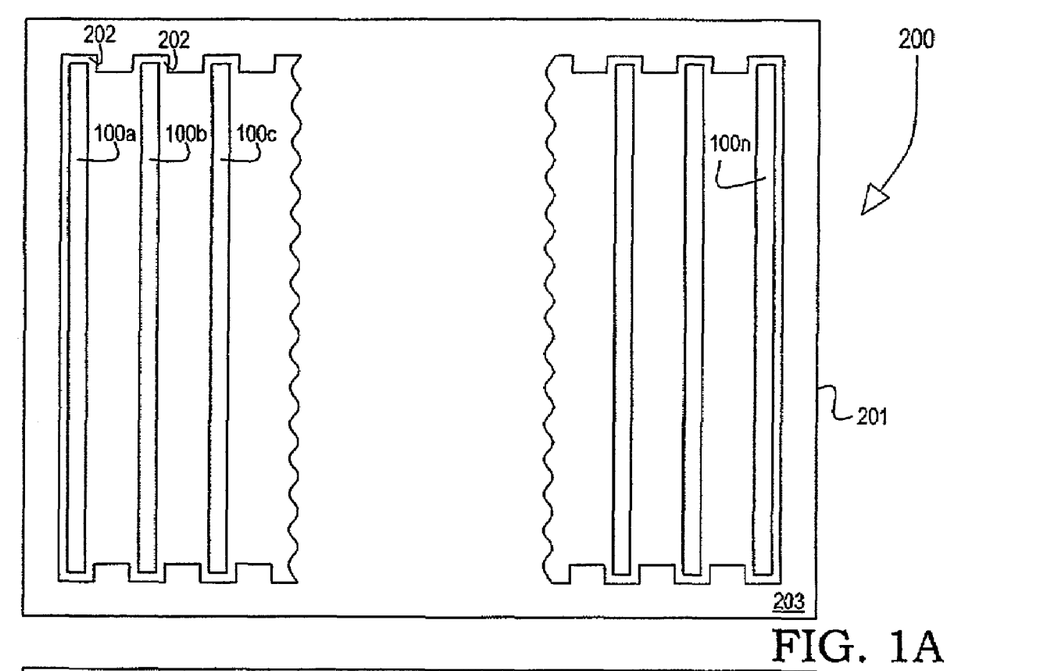
FIG. 1A is a front view of a data processing configuration suitable for implementing an embodiment of the present invention.
Figure 1B:
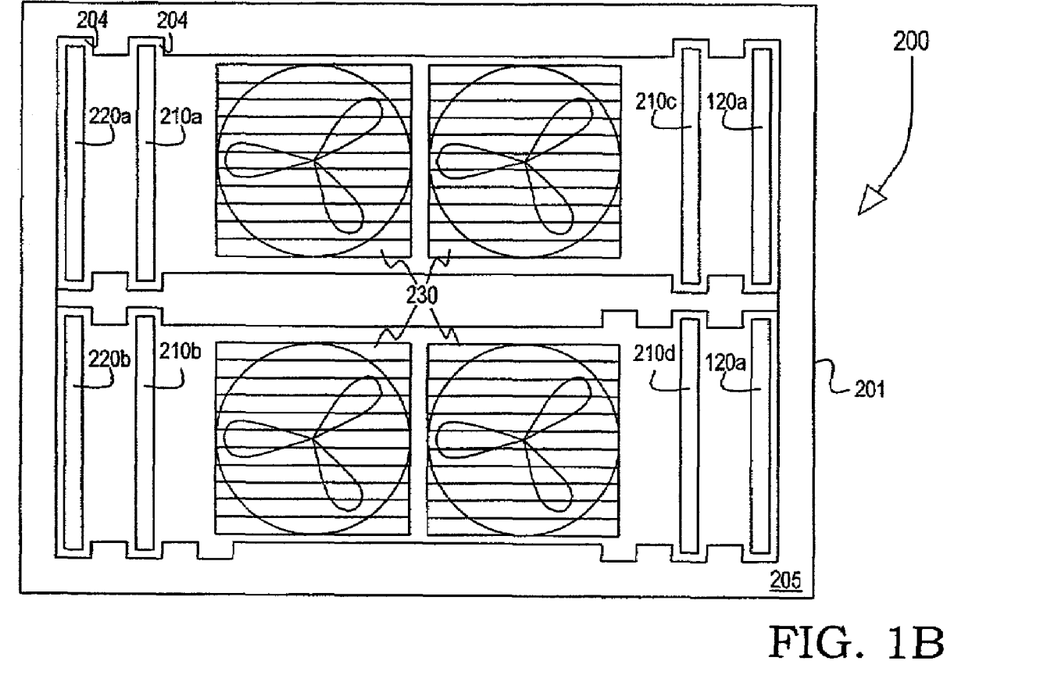
FIG. 1B is a rear view of the data processing configuration of FIG. 1A.

Before describing the remote CMOS setting storage features of the present invention, selected elements of a data processing configuration particularly suitable for implementing the present invention are illustrated. Turning first to FIGS. 1A and 1B, front and rear views respectively of an embodiment of a data processing configuration 200 are illustrated. The depicted embodiment of data processing configuration 200 includes a plurality of interconnected server blades 100 (described in greater detail below) and a management module according to the present invention that stores and configures CMOS settings for each blade 100 in the configuration.

Figure 2:
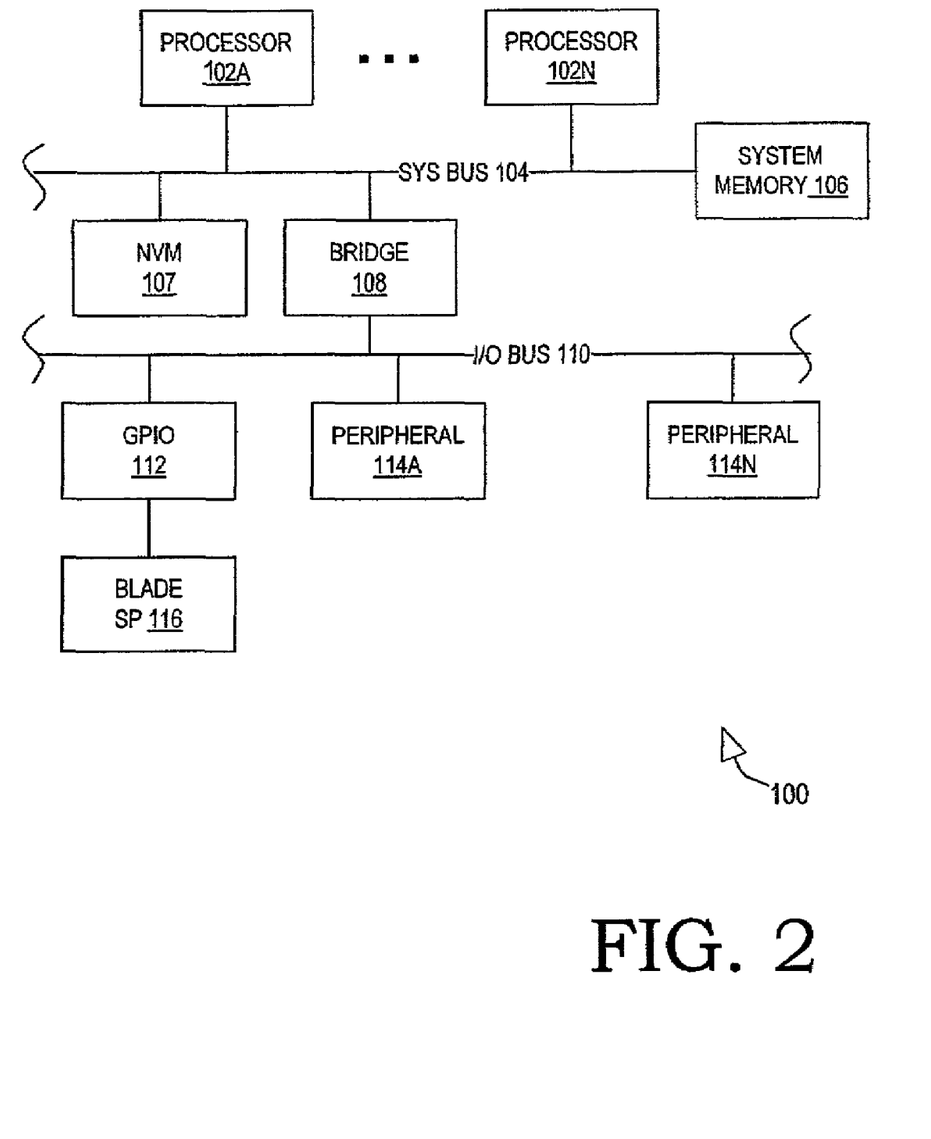
FIG. 2 is a block diagram of selected elements of a data processing system or blade suitable for use in the data processing configuration of FIGS. 1A and 1B.

As shown in the front view of FIG. 1A, data processing configuration 200 includes a cabinet (or chassis) 201 having a plurality of slots 202 in its front face 203. Each slot 202 is configured to receive a printed circuit board-based subsystem such as a server blade 100. (The set of server blades depicted in FIG. 2 are identified by reference numerals 100a through 100n). Each server blade 100 is plugged into an interconnection (not depicted) referred to herein as the mid-plane because of its intermediate location between server blades 100 and other adapters or blades that are plugged into the opposite side of the mid-plane from the rear face of cabinet 201 (see FIG. 1B). In this embodiment, the interconnected server blades 100 in configuration 200 are suitable for implementing a local area network (LAN) such as an Ethernet LAN in which each blade 100 has its own IP address and Media Access Control (MAC) address. Configuration 200 may itself be connected to an external network such as the Internet through a gateway (not depicted) or other suitable network device.

The number of server blades 100 within cabinet 201 varies with the implementation. In a representative configuration, the front face 203 of cabinet 201 includes 14 or more slots 202 for receiving server blades 100. Each server blade 100 is typically implemented as a full-height adapter.

The rear view of data processing configuration 200, depicted in FIG. 1B. illustrates additional selected elements of the configuration. More specifically, the rear face 205 of cabinet 201 includes a set of half-height slots 204. Various half-height modules or blades are plugged into the previously mentioned mid-plane via slots 204 in rear face 205. In the depicted embodiment, these modules include a set of network interconnect modules identified by reference numerals 210a, 210b, 210c, and 210d, a pair of power supply modules 220a and 220b, and first and second system management modules 120a and 120b (generically or collectively referred to as management module(s) 220). Also shown are a set of cabinet cooling fans 230. It will be appreciated that the number of network interface modules 210, power supply modules 220, and cabinet cooling fans 230 is implementation specific. Network interface modules 210 provide connectivity between the server blades 100 and an external network such as the Internet. In one embodiment, each server blade 100 is configured with four independent network connection paths via the four separate modules 210a through 210d. The power supply modules 220a and 220h provide configuration 200 with the required voltage levels.

Turning now to FIG. 2, selected features of the server blades 100 depicted in FIG. 1A are illustrated. As its name implies, each server blade 100 is typically implemented entirely upon a single printed circuit board or "blade." In the depicted embodiment, server blade 100 includes a set of main processors 102A through 102N(generically or collectively referred to as processor(s) 102) that are connected to a system bus 104. Main processors 102 may be implemented with any of a variety of commercially distributed general purpose microprocessors including, as examples, x86 processors typified by the Pentium® family of processors from Intel Corporation or RISC processors typified by the PowerPC® family of processors from IBM Corporation. The depicted embodiment of server blade 100 is implemented as a symmetric multiprocessor (SMP) system in which each processor 102 has substantially equal access to a system memory 106 via system bus 104.

System memory 106 is typically implemented with a volatile storage medium such as an array of dynamic random access memory (DRAM) devices. Server blades 100 further include persistent or non-volatile storage identified by reference numeral 107a through 107n (collectively or generically referred to as NVM 107) that is used for local storage of server blade CMOS settings data. NVM 107 of server 100 is typically implemented as battery-backed CMOS storage according to well known practice. Alternatively, NVM 107 may comprise a portion of a flash memory card or comparable electrically erasable ($E^2$) device.

In server blade 100, a bus bridge 108 provides an interface between system bus 104 and an I/O bus 110 to which one or more peripheral devices 114A through 114N (generically or collectively referred to as peripheral device(s) 114) as well as a general purpose I/O (GPIO) port are connected. Peripheral devices 114 may include devices such as a graphics adapter, a high-speed network adapter or network interface card (NIC), a hard-disk controller, and the like. I/O bus 110 is typically compliant with one of several industry standard I/O bus specifications including, as a common example, the Peripheral Components Interface (PCI) bus as specified in *PC/Local Bus Specification Rev* 2.2 by the PCI Special Interest Group (www.pcisig.com).

The depicted embodiment of server blade 100 further includes a local blade service processor 116 connected to GPIO port 112. Local blade service processor 116 is configured to provide support for the main processors 102 of blade 100. This support may include, for example, monitoring the power supplied to main processor (s) 102 and, in the event of a blade crash, initiating a main processor restart. In this embodiment, local blade service processor 116 may receive updated CMOS settings from the Management Module(s) 120 by communicating over an internal interconnect 136 on the midplane. Blade service processor 116 can thus read the CMOS configuration parameters from the Management Module(s) 120 each time the blade boots, or receive a synchronous updates from the Management Module(s) 120.

Figure 3:
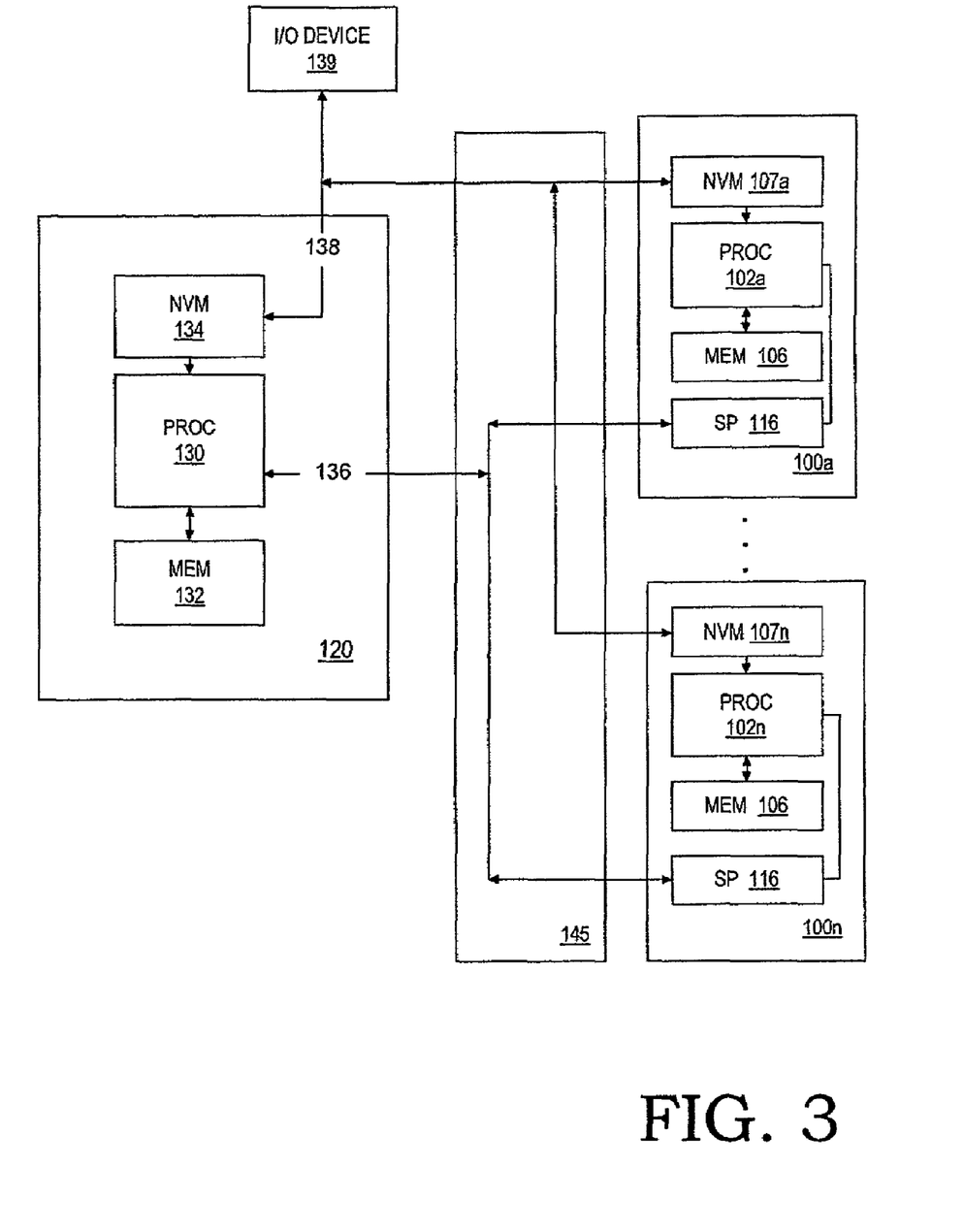
FIG. 3 is a block diagram of selected elements of the data processing configuration emphasizing the remote storage and configuration of CMOS settings according to one embodiment.
Figure 4:
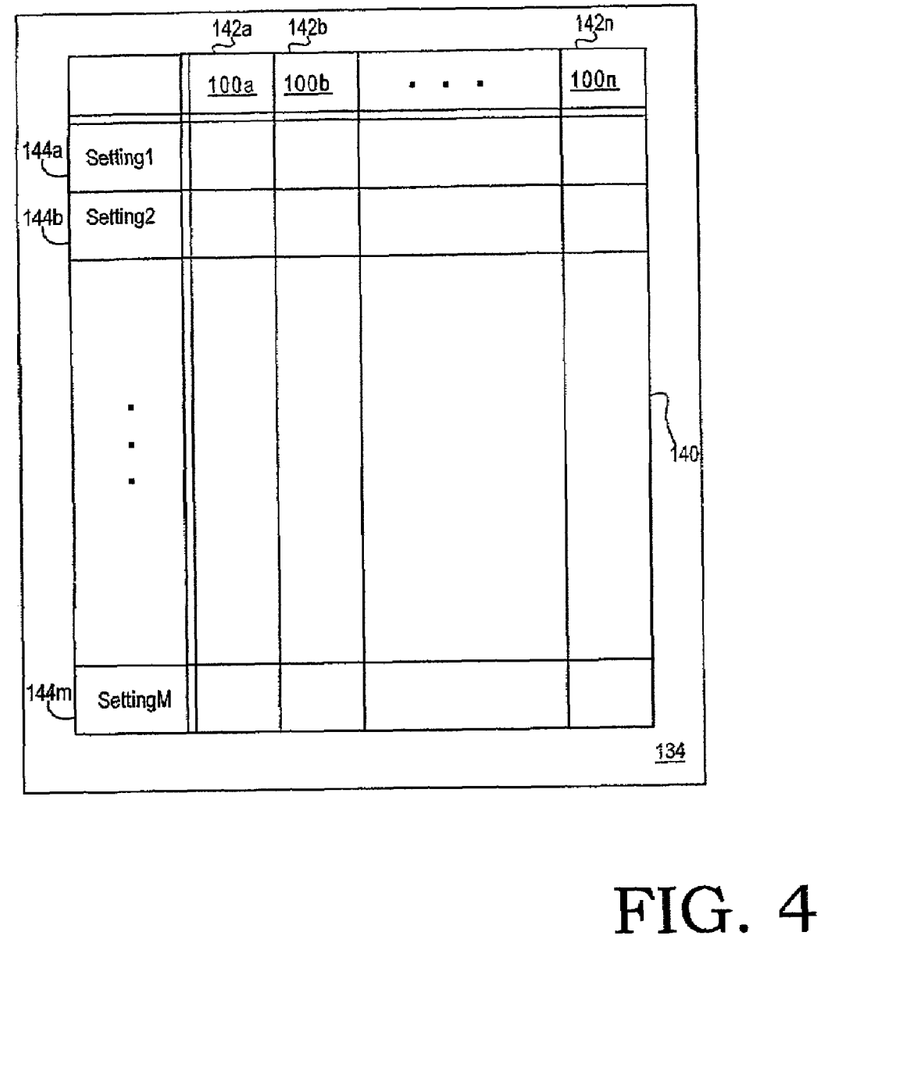
FIG. 4 is a conceptualized representation of a CMOS setting table according to one embodiment of the present invention.

Turning now to FIG. 3 and FIG. 4, selected elements of the management module(s) 120 of FIG. 1B are illustrated to emphasize the remote CMOS setting storage and configuration features of the present invention. In the depicted embodiment, management module 120 includes a processor 130, a system memory 132, and non-volatile storage (NVM) 134. System memory 132 is typically volatile storage comprised of conventional DRAM devices that provide storage for data and programs that are executing. NVM 134, as its name implies, provides a persistent storage device suitable for holding programs and data that are executed when the management module 120 is booted. NVM 134 is typically implemented as a flash memory card or some other form of electrically erasable non-volatile device.

In the server blade environment depicted in FIGS. 1A and 1B, management module 120 typically provides system management functions to the set of server blades 100 of data processing configuration 200. Thus, processor 130 of management module 120 may be implemented via software stored in NVM 134 and system memory 132 as a service processor configured to monitor or control various resources (subsystems) of the configuration. Typically, the resources managed by management module 120 include those resources shared by multiple server blades including, as examples, system power and cooling fans.

To facilitate its management functions, management module processor 130 is connected to the local blade service processor 116 on each server blade 100 via an internal interconnect identified by reference numeral 136. Internal interconnect 136 enables communication between management module processor 130 and server blades 100. Interconnect 136 is typically implemented according to a standardized communication protocol such as an Ethernet, RS-232, RS-485, or I$^2$C protocol. Internal interconnect 136, in addition to enabling communication that facilitates conventional service processor functions, provides a path over which CMOS setting information can be exchanged.

NVM 134 of management module 130 contains, in addition to any code required for management module 120 to boot itself following a reset, a CMOS setting table identified by reference numeral 140 in the conceptualized illustration of FIG. 4. CMOS setting table 140 includes a set of columns 142a through 142n and a set of rows 144a through 144m. Each column 142 corresponds to a server 100 while each row 144 corresponds to a particular CMOS setting. Each server 100 is preferably configured to retrieve its CMOS settings from table 140 as part of its boot sequence. The CMOS setting values retrieved from table 140 are then stored in the server's local NVM 107. By storing CMOS settings remotely and configuring the server blades to retrieve their settings as part of the boot sequence, the invention reduces complexities that arise from locally stored CMOS settings. In a system employing locally stored CMOS settings, it is generally difficult to guarantee substantially identical functionality when a server blade is replaced or upgraded.

The CMOS settings retrieved from table 140 are, nevertheless, stored in local NVM 107 to enable server blades 100 to complete a boot sequence even if management modules 120 are removed, or replaced, or otherwise unavailable. In other words, NVM 107 provides a local cache of a blade's CMOS settings that can be accessed when the settings cannot be retrieved from management module 120 thereby enabling blades 100 to boot even in the absence of an accessible or functional management module. Moreover, local storage of CMOS settings in NVM 107 enables a newly installed management module 120 to obtain values for its CMOS settings table 140A preferred embodiment of management module 120 as depicted in FIG. 3 is enabled to allow modification of CMOS setting table 140 remotely via a dedicated interconnection identified by reference numeral 138. Using interconnection 138, the contents of CMOS setting table 140 may be modified and stored regardless of the state of the internal interconnect 136 and/or the state of server blades 100. Interconnection 138, for example, could be implemented with an I$^2$C compliant bus that connects a device 139 having keyboard, LCD display screen, and microcontroller with NVM 140. I$^2$C is a widely known two-wire communication bus protocol developed by Philips. Using the device 139, a user could configure CMOS setting table 140 before power is applied, before server blades are installed in their respective slots, and so forth.

Dedicated interconnect 136, in addition to enabling the remote configuration of CMOS setting table 140, is preferably further configured to provide a dedicated (out-of-band) network connection to local blade service processor 116. The local blade service processor 116 can then access the NVM 107 of each server blade 100. In this embodiment, interconnect 136 would enable the downloading of CMOS setting information from management module 120 to a server blade 100 regardless of the blade's state (i.e., regardless of whether the blade is running, booting, powered off, etc.).

As discussed previously, the specific implementation of CMOS settings can vary substantially among different blade designs and different BIOS versions. This customization increases the difficulty of ensuring that replacement server blades function in a substantially identical manner to their predecessors. One embodiment of the present invention addresses this issue by implementing a CMOS setting programming interface in management module 120 and each server blade 100. The programming interface provides command abstractions for each of the various CMOS settings. The command abstractions are mapped, within the BIOS of each server blade, to the appropriate CMOS setting bit addresses. Providing this programming interface enables management module 120 to maintain and download CMOS settings to server blades without regard to the actual implementation of the CMOS bits on the server blade. In this embodiment, management module 120 is configured to configure a blade's CMOS settings by downloading a series of commands such as: SET PowerEnable(ON) in lieu of attempting to manipulate particular bit addresses directly.

Figure 5:
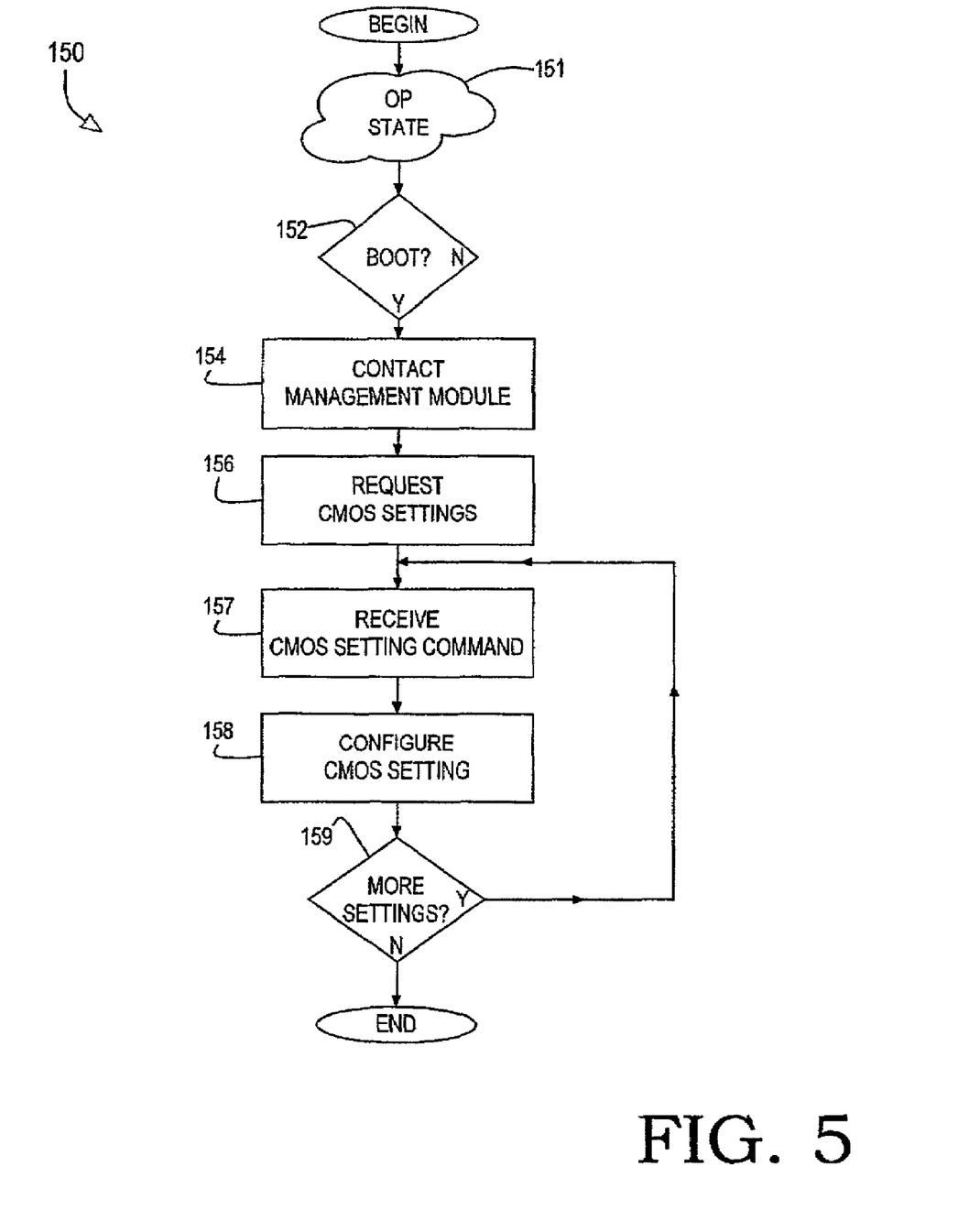
FIG. 5 is a flow diagram of a method of configuration CMOS setting information in a server blade environment according to one embodiment of the present invention.

The command abstraction feature of the present invention is emphasized in the flow diagram of FIG. 5 illustrating a method of configuring CMOS settings in a server blade environment according to one embodiment of the invention. In the depicted embodiment, a server blade or other comparable data processing system is assumed to be in a pre-existing operational state (block 151). The operational state is typically either a powered-off state or a functional state. For purposes of the CMOS configuration features of the present invention, the server is configured to detect (block 152) the initiation of a boot sequence. If no boot sequence is detected, the server blade remains in the pre-existing operational state.

Upon initiation of a boot sequence, however, a server blade contacts (block 154) the management module, typically via the local blade service processor 116 and the internal interconnect, and requests (block 156) the management module to provide its CMOS settings. In response to a request from a server blade, the management module generates a command abstraction corresponding to a predetermined first CMOS setting and sends the command abstraction to the server blade. Upon receiving (block 157) a CMOS setting command abstraction, the server blade BIOS code converts the command abstraction to a particular bit address based upon a previously stored command mapping within the server blade's non-volatile storage. After converting the command abstraction to a specific bit address and setting, the server blade configures (block 158) the CMOS setting corresponding to the determined bit address and setting. If (block 159) additional CMOS settings are to be set as part of the boot sequence, the server blade and management module repeat the process of generating a command abstraction, transmitting the abstraction to the server, and converting the abstraction to a particular CMOS setting.

It will be apparent to those skilled in the art having the benefit of this disclosure that the It present invention contemplates a system and method for configuring CMOS settings suitable for use in a data processing configuration implementing multiple, swappable server blades. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A data processing configuration, comprising:
   a set of data processing subsystems, each subsystem including persistent storage suitable for containing boot configuration information;
   a management module connected to each of the subsystems, wherein the management module includes management module persistent storage containing boot configuration information corresponding to at least one of the subsystems;
   wherein at least one of the subsystems includes boot code means configured to retrieve its boot configuration information from the management module persistent storage during a boot of the subsystem;
   wherein the management module is configured to provide the boot configuration information as a set of boot configuration commands; and
   wherein the subsystem is configured to translate at least one of the boot configuration commands into a corresponding boot configuration bit address specific to the subsystem.

2. The configuration of claim 1, wherein the management module persistent storage includes a boot configuration table containing boot configuration settings corresponding to each of the subsystems in the configuration.

3. The configuration of claim 1, further comprising a cabinet having a plurality of slots, wherein each of the subsystems occupies a corresponding slot, and wherein each of the subsystems share cabinet resources including system power supplies and cooling fans.

4. The configuration of claim 1, wherein the subsystem is further operable, upon determining that the management module is unavailable during a boot sequence, to retrieve boot configuration information from the subsystem's persistent storage.

5. The configuration of claim 1, further comprising a dedicated connection between the management module and a subsystem and operable for configuring the boot configuration settings in the subsystem independent of power supplied to the subsystem's processors.

6. A method of booting data processing subsystems in a data processing configuration, comprising:
   responsive to a boot event, initiating a boot sequence for at least one of the data processing subsystems;
   during the boot sequence, retrieving boot configuration information from a management module connected to each of the set of data processing subsystems;
   storing the retrieved information in local persistent memory of the data processing subsystem;
   upon determining that the management module is unavailable during a boot sequence, retrieving boot configuration information from the subsystem's persistent storage; and
   configuring the boot configuration settings in the subsystem independent of power supplied to the subsystem's processors using a dedicated connection between the management module and the subsystem.

7. The method of claim 6, wherein retrieving the boot configuration information comprises retrieving the information from a boot configuration table in persistent storage of the management module containing boot configuration settings corresponding to each of the subsystems.

8. The method of claim 6, wherein the boot configuration information is retrieved as a set of boot configuration commands from the management module.

9. The method of claim 8, wherein retrieving the boot configuration information includes translating each of the boot configuration commands into a corresponding boot configuration bit address specific to the subsystem.

10. A computer program product comprising computer executable instructions stored on a computer readable medium for booting data processing subsystem in a data processing configuration, the instructions comprising:
    instruction for initiating a boot sequence on at least one of the data processing subsystems responsive to a boot event;
    instruction for retrieving boot configuration information for at least one of the data processing subsystems from a management module connected to each of the set of data processing subsystems; and
    instructions for storing the retrieved information in local persistent memory of the data processing subsystem;
    instructions for configuring the boot configuration settings in the subsystem independent of power supplied to the subsystem's processors using a dedicated connection between the management module and the subsystem.

11. The computer program product of claim 10, wherein the instructions for retrieving the boot configuration information comprises instructions for retrieving the information from a boot configuration table in persistent storage of the management module containing boot configuration settings corresponding to each of the subsystems.

12. The computer program product of claim 10, wherein the boot configuration information is retrieved using a set of boot configuration commands from the management module.

13. The computer program product of claim 12, wherein the instructions for retrieving the boot configuration information includes instructions for translating each of the boot configuration commands into a corresponding boot configuration bit address specific to the subsystem.

14. The computer program product of claim 10, further comprising instructions for retrieving boot configuration information from the subsystem's persistent storage upon determining that the management module is unavailable during the boot sequence.

15. The configuration of claim 1, wherein each of the subsystems comprises a server blade having at least one processor and a system memory accessible to processor.

* * * * *